US005754449A

United States Patent [19]
Hoshal et al.

[11] Patent Number: 5,754,449
[45] Date of Patent: May 19, 1998

[54] METHOD AND APPARATUS FOR RECORDING TIME HISTORY DATA OF PHYSICAL VARIABLES

[75] Inventors: Gregory D. Hoshal, Okemos; Matthew R. Busdiecker, East Lansing; Jack H. Jenkins, Okemos, all of Mich.

[73] Assignee: Instrumented Sensor Technology, Inc., Okemos, Mich.

[21] Appl. No.: 428,327

[22] Filed: Apr. 25, 1995

[51] Int. Cl.$^6$ .................... G01D 1/14; G01D 21/02; G01D 15/00
[52] U.S. Cl. ............ 364/550; 364/551.01; 364/566; 364/557; 364/558; 364/424.06; 360/5
[58] Field of Search .................. 364/550, 420, 364/551.01, 424.03, 424.06, 557, 558, 575, 566; 395/557; 360/5

[56] References Cited

U.S. PATENT DOCUMENTS

| 3,702,989 | 11/1972 | Provenzano, Jr. et al. | 340/172.5 |
|---|---|---|---|
| 4,114,450 | 9/1978 | Shulman et al. | 73/489 |
| 4,227,198 | 10/1980 | Preskitt et al. | 346/33 C |
| 4,409,670 | 10/1983 | Herndon et al. | 364/550 |
| 4,646,241 | 2/1987 | Ratchford et al. | 701/14 |
| 4,730,247 | 3/1988 | Takahara | 364/560 |
| 4,811,249 | 3/1989 | Marsh | 364/550 |
| 4,862,394 | 8/1989 | Thompson et al. | 364/551.01 |
| 4,910,692 | 3/1990 | Outram et al. | 364/550 |
| 4,933,882 | 6/1990 | Mohnar et al. | 364/550 |
| 5,226,153 | 7/1993 | DeAngelis et al. | 395/575 |
| 5,231,593 | 7/1993 | Notess | 364/550 |
| 5,239,468 | 8/1993 | Sewersky et al. | 364/424.03 |

OTHER PUBLICATIONS

"Instruction Manual for the Saver—Shock and Vibration Enviroment Recorder" Dallas Instruments, Jun. 1994.
"EDR and EDRIS User's Manual" Instrumented Sensor Technology, Revised Edition, Apr. 1992.
"Safeguard Seismic Unit 1000D Digital Seismograph" Philip R. Berger & Associates, Inc.
"If the Earth Moves Every Time You're On the Job . . .", Instantel Digital Seismograph, Dec., 1984.
"Instantel DS–377 Digital Seismograph", Instantel, Inc.
"The A–700 Accelocorder", Teledyne Geotech.
"Digital Cassette Accelerograph Model DCA–333", Terra Technology Corp.
"Digital Accelerograph: Model DCA–333 with Ramdeck Solid State Memory", Terra Technology Corp.
"Model IDS–3602A 16 Bit Accelerograph", Terra Technology Corp.
"SSA–1 Solid State Accelerograph", Earthquake Engineering Instruments, Sep. 1993.
"PDR–2 CompuSeis Digital Event Recorder", Kinemetrics Systems.
"Electronic Transport Monitor", SMT & Hybrid.
"PAL Peak Acceleration Logger", Dallas Instruments, Inc.
"Model SR–4C ShocKorder", Dallas Instruments, Inc.
"type 2503 Bump Recorder", Bruel & Kjaer Instruments, Inc.
"Model SR–4 ShocKorder", Dallas Instruments, Inc.

Primary Examiner—James P. Trammell
Assistant Examiner—Tuan Q. Dam
Attorney, Agent, or Firm—Warner Norcross & Judd LLP

[57] ABSTRACT

A method and apparatus for recording time history data of physical variables during a recording session divided into discrete time windows each uniquely paired with a discrete segment of memory. Each recordable event is stored in the segment of memory corresponding to the time window during which it occurred. If the corresponding segment of memory is filled, the event is processed using an overwrite scheme that considers for replacement only those events in that segment of memory.

21 Claims, 5 Drawing Sheets

METHOD AND APPARATUS FOR RECORDING TIME HISTORY DATA OF PHYSICAL VARIABLES

BACKGROUND OF THE INVENTION

The present invention relates to data recording and, more particularly, to a method and apparatus for recording time history data of physical variables.

A variety of recording devices have been developed to sense and record numerous physical variables, such as shock, vibration, strain, force, temperature, humidity, and even barometric pressure. Because of their ability to measure and record such a broad range of variables, these devices are used in a wide range of applications. For example, data recorders are commonly used in the transportation industry along side, or in the place, of cargo to sense and record the environmental conditions during transportation and handling. The data collected by the recorders is later analyzed and might be used, for example, to determine how the transportation and handling process can be improved.

Another application is seismic recorders used to sense and record seismic activity. These devices are used, for example, in the construction and mining industries to sense and record the energy of vibrations generated by explosive charges.

Data recording devices typically record data in either a continuous format or a discrete format. Continuous recording devices simply record data continuously from the start to the end of the recording session. This technique is not well suited to collecting data over long recording sessions because of the huge amount of memory needed to record all of the data.

Discrete recording devices record only portions of the data sensed during the recording session. Because they do not record data continuously, they are better suited for use in applications requiring longer recording sessions. A discrete recording device records segments of data at either periodic intervals (time-based recording) or upon the occurrence of a "trigger" event (event-based recording). For example, a time-based recorder might record a short segment of data every 3 minutes, while an event-based recorder might record a segment of data each time one of the sensed variables satisfies a predetermined criteria.

While discrete recording devices are a marked improvement over continuous recording devices, they still include a limited amount of memory that may be consumed before the end of the recording session. If enough triggered recordings occur early in the recording session, then the memory will be filled prematurely. This would preclude recording of subsequent, possibly more significant events.

To further address memory shortage, some recorders use "overwriting" memory management techniques. Overwriting is a process which allows certain previously recorded events to be replaced by subsequent events—particularly after the memory is filled. First, the sensed data is recorded using time-based or event-based recording. As each event is recorded, a "rank" for that event also is computed and stored in memory. For example, the rank may correspond to the magnitude of the triggering event. This process is repeated until the memory is filled. Thereafter, the rank of each subsequent event is compared with that of the recorded event having the lowest rank. If the subsequent event has a higher rank, it replaces, or overwrites, the recorded event having the lowest rank. The comparing and overwriting steps continue until the recording session is complete.

One disadvantage of the overwrite process is that, if a large number of high rank signals are measured over a relatively short time period, most or all of the recorded data will be from this small time period. Little or no data will be retained from other periods during the recording session. This problem is particularly acute in the transportation industry where a single recording session may involve a number of different transport modes or regions. For example, a recording session may involve transport by rail, where the events have an average rank of 1 g rms, and transport by boat, where the events have an average rank of 0.3 g rms. In this example, overwrite mode will probably result in most or all of the retained data coming during rail transport. Obviously, this provides little or no data about the boat shipment portion of the recording session.

In the transportation industry, it is often desirable to record both impact-type events and vibration-type events, which typically have a significantly lower rank. Using the overwrite process, the recorded time history generally will not include vibration-type data because it will have been overwritten by the higher rank impact-type data.

SUMMARY OF THE INVENTION

The aforementioned problems are overcome by the present invention wherein the recording session is divided into a number of discrete time windows, and each time window is uniquely paired with a discrete segment of memory. Each event can be recorded only in the segment of memory corresponding to the time window during which the event occurs. If the corresponding memory segment is filled, the event is processed using an overwrite scheme that considers for replacement only those events in that segment. The process repeats for each time window as the recording session progresses.

Because the overwrite scheme is limited by memory segment, the resulting time history data is assured to have a representative sample of data from each time window.

In a preferred embodiment, each segment of memory is further partitioned into subsegments by event type (e.g. impact-type or vibration-type). Recording decisions for each event are made both on its time of occurrence and on its type. The overwrite scheme considers for replacement within subsegments only those events occurring in the same time window and being of the same type.

The present invention provides an effective method and apparatus for recording time history data of physical variables wherein the recorded data includes a representative sample of data from each of the time windows and optionally for each event type.

These and other objects, advantages, and features of the invention will be more readily understood and appreciated by reference to the detailed description of the preferred embodiment and the drawings.

DETAILED DESCRIPTION OF THE PREFERRED EMBODIMENT

Figure 1:
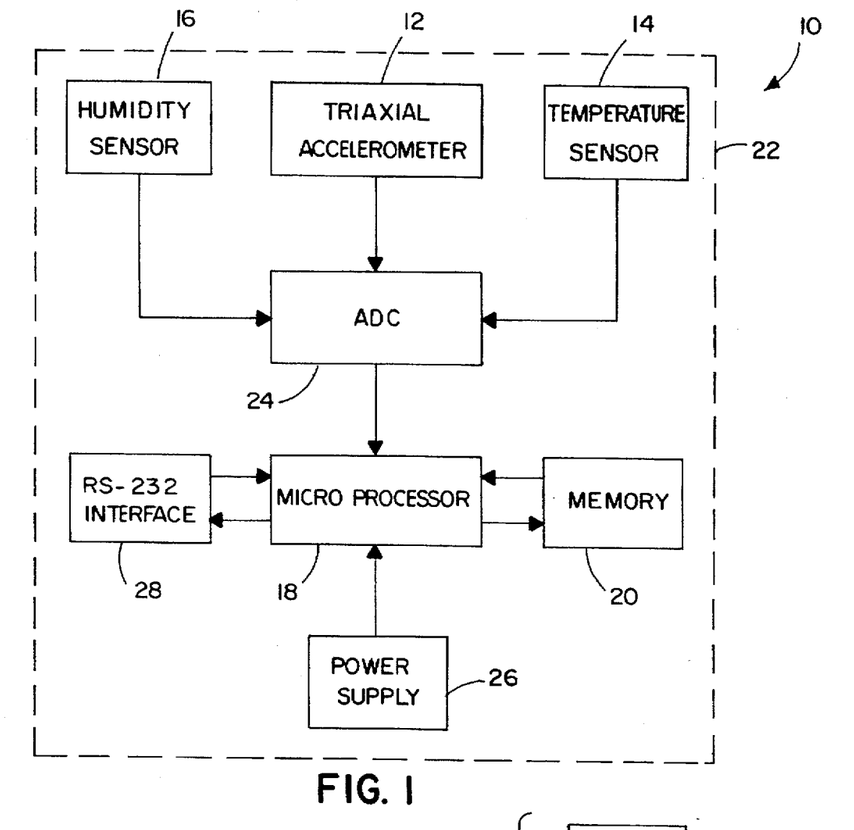
FIG. 1 is a block diagram of the data recorder.

A data recording device according to a preferred embodiment of the invention is illustrated in FIG. 1, and generally designated 10. For purposes of this disclosure, the present invention is described in connection with a data recorder for use in the transportation industry. However, the present invention is equally well suited for use in other applications where it is desirable to record time history data of physical variables.

I. The Data Recorder

The data recorder 10 is typically a self-contained device placed along side cargo to measure and record environmental conditions encountered during transportation, such as shock, vibration, temperature, and humidity. When transportation is complete, the data stored in the recorder 10 is "dumped" and analyzed, for example, to help determine how the transportation process can be improved.

The data recorder 10 generally includes a microprocessor 18 which obtains shock or vibration data from a tri-axial accelerometer 12, temperature data from a temperature sensor 14, and relative humidity data from a humidity sensor 16. Obviously, the data recorder 10 can include other sensors to measure other physical variables. In a preferred embodiment, the accelerometer 12 is an internal, tri-axially mounted piezo-resistive accelerometer that provides separate signals for the X-axis, Y-axis, and Z-axis.

The recorder 10 also includes an analog-to-digital converter (ADC) 24 for converting the analog signals generated by the sensors 12, 14, and 16 into digital signals recognizable by the microprocessor 18. The microprocessor 18 receives accelerometer input from the ADC 24 on three separate channels, one corresponding to each axis of the accelerometer 12. Alternatively, the data can be multiplexed. In addition, the recorder 10 includes a power supply 26, a memory 20 for recording measured data, an RS-232 interface 28 for programming the recorder 10 and for downloading recorded data, and a housing 22 for containing the recorder components.

II. Trigqering Events and Recorded Events

Operation of the data recorder 10 is controlled by firmware that is programmed into the recorder at the factory. Alternatively, the program can be implemented via hardware, software, or any other programming technique. Creating this firmware based upon the description set forth in this specification is well within the capabilities of one having ordinary skill in the programming art.

Figure 2:
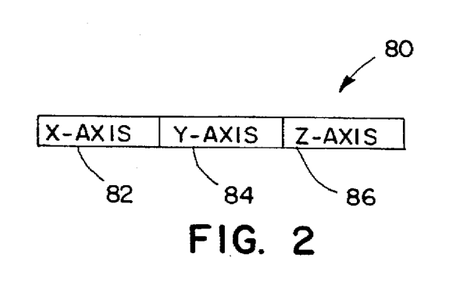
FIG. 2 is a block diagram of a data sample from a tri-axial accelerometer.

The data recorder 10 is capable of operating in either "fill and stop" mode or "overwrite" mode. In either mode, the microprocessor 18 repeatedly samples the desired sensors until a user defined criteria is satisfied (e.g. a specific increment of time has passed or the acceleration measured by the accelerometer exceeds a threshold value). Satisfaction of the criteria is referred to as a "trigger event." When a trigger event occurs, the microprocessor 18 stores a sequence of samples in memory 20 along with a header 108 (see FIG.3), the contents of which will be described below. As shown in FIG. 2, each stored sample 80 preferably includes data representative of the value of the X, Y, and Z axes of the accelerometer, 82, 84, and 86 respectively.

In fill and stop mode, the number of samples preserved for any given event varies with the period of time during which the samples satisfy the trigger criteria. For example, in the transportation industry, it is common for a trigger-event to occur when the acceleration measured along any axis of the accelerometer exceeds a predefined minimum. In fill and stop mode, the recorder 10 begins recording data when the trigger-event occurs and continues until the signals from each axis of the accelerometer fall back below the predefined minimum.

In overwrite mode, the total number of samples preserved for any given event is fixed by the user before operation. Consequently, the recorded events are of fixed length.

Figure 3:
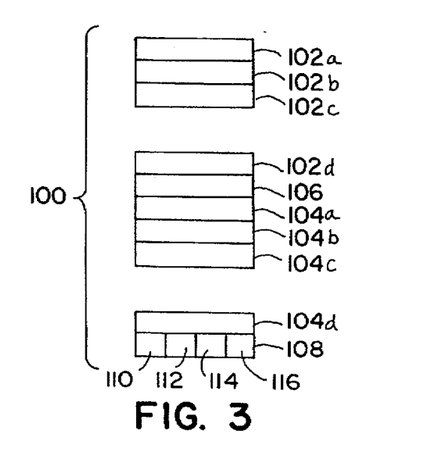
FIG. 3 is a block diagram of the data to be recorded from an event.

Preferably, the recorded event 100 will include a plurality of pre-trigger samples 102a–d, a plurality of post-trigger samples 104a–d, and the sample constituting the trigger-event 106 (see FIG. 3). Each stored event 100 also preferably includes a header 108 containing the time and date of occurrence 110 of the trigger-event and the address 112 of the beginning of the current event buffer (discussed below). Many conventional accelerometers are affected by changes in temperature. As a result, it is also desirable to record the sensed temperature 114 at the time of the event in the event header to allow dynamic or subsequent compensation of the data based on temperature. And finally, the header 108 includes a rank 116 assigned to the event. The rank 116 is used in connection with the overwrite scheme as described below.

The data recorder 10 preferably records samples upon the occurrence of either a time-based trigger or an event-based trigger. A time-based trigger is a periodic trigger that causes events to be stored at user defined intervals of time. The microprocessor 18 monitors an internal clock (not shown) to determine when a time-based trigger occurs. An event-based trigger occurs when one of the sensed physical variables satisfies a user defined criteria. For example, an event-based trigger may occur when the sensed temperature exceeds a defined value, the sensed humidity falls below a defined value, or the sensed acceleration exceeds a defined value for a specified period of time.

In addition to the event data discussed above, the recorder 10 also stores a log of the temperature and humidity sensed at periodic intervals. This information is stored separately from the acceleration data using conventional techniques.

III. Partitioning of Memory

Figure 4:
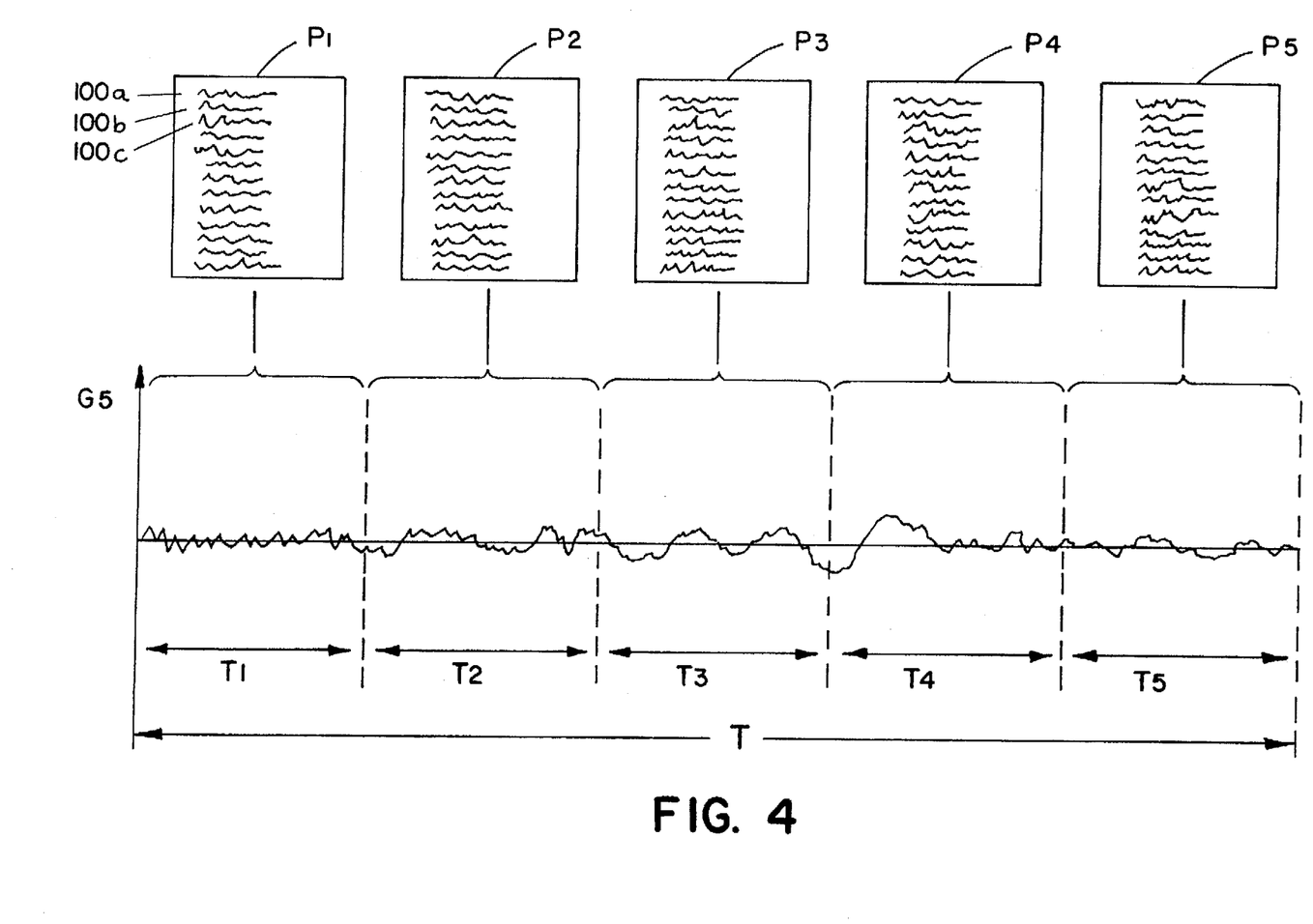
FIG. 4 is a block diagram showing the allocation of memory segments based on the time windows of the recording session.

In the preferred embodiment, the memory 20 is partitioned into discrete segments each corresponding to a separate time window during the recording session. As discussed below, all overwriting is conducted only in the time window associated with the current event. Consequently, the time history of data will include representative data from each time window. As illustrated in FIG. 4, if the recording session T includes five time windows T1–T5, the memory 20 can be divided into five separate segments P1–P5—segment P1 corresponding to the first time window T1, segment P2 corresponding to the second time window T2, and so on. Obviously, the number of time-windows and memory segments can vary as desired.

The length of each segment P1–P5 is selected to allow storage of the desired number of events 100a–100c. In this embodiment, segments P1–P5 are of equal length. However, the length of each segment can vary to provide a different number of events for each time period.

IV. Samplinq and Storing Process

Figure 5:
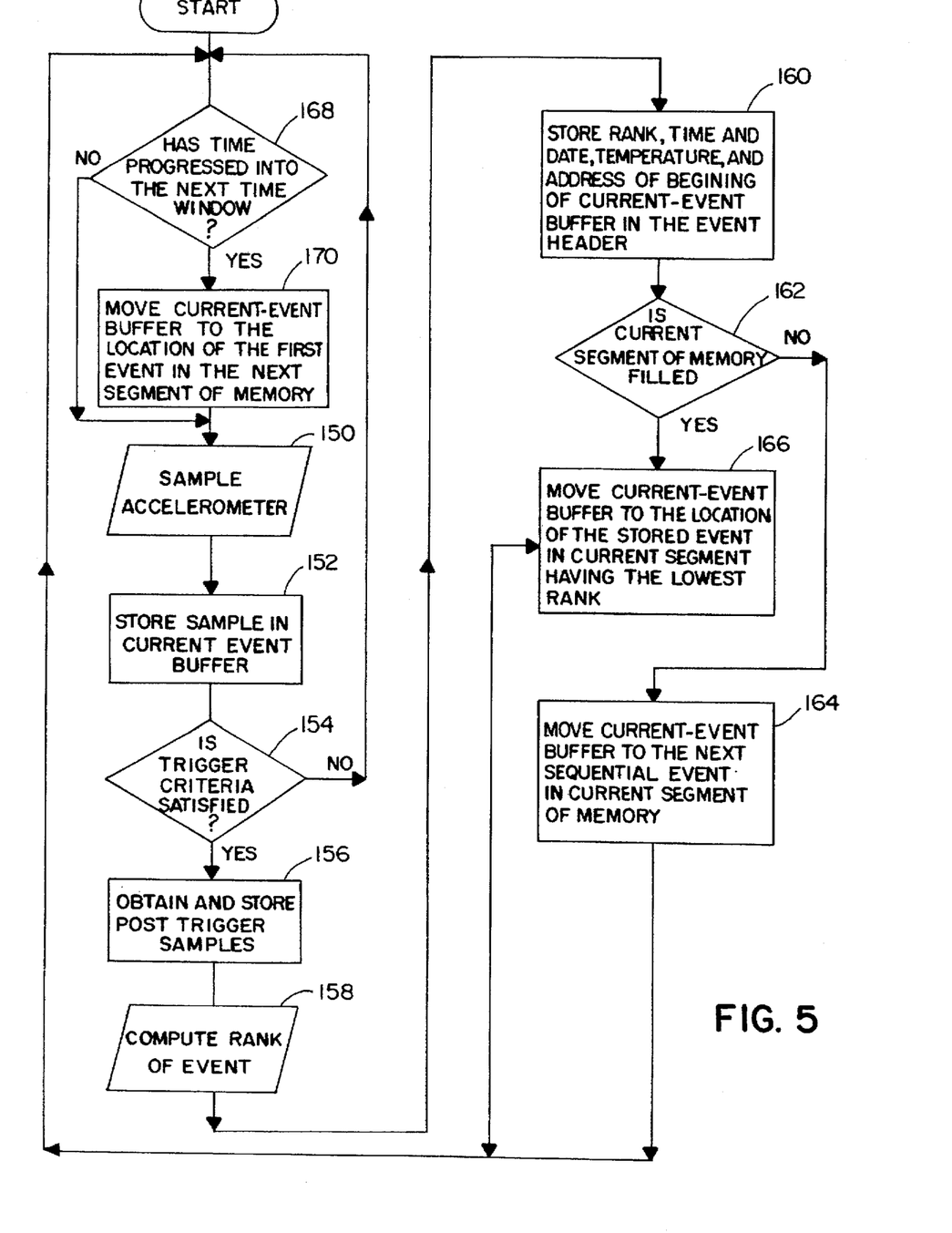
FIG. 5 is a flow chart illustrating the overwrite process.

The sampling and storing process will now be described in greater detail with reference to the flow chart of FIG. 5.

Prior to operation, the user defines the sampling frequency of the microprocessor, the operating mode, the criteria for a trigger-event, the trigger duration, the number of pre-trigger samples to be stored, the number of post-trigger samples to be stored, the maximum number of events to be stored, and the number of time windows. These parameters are typically entered into the recorder 10 using a personal computer (not shown) via RS-232 interface 28. As described, the recorder 10 is programmed to record 10 pre-trigger samples, the trigger-event, and 29 post-trigger samples each time the acceleration measured along any axis of the accelerometer exceeds a magnitude of 1.2 times the force exerted by gravity, or 1.2 gs, for at least 200 milliseconds. These parameters are selected for description and may change from application to application.

Referring now to block 150, the microprocessor 18 samples the tri-axial accelerometer 12 via ADC 24. The digital data received from the ADC is sequentially stored 152 as sample 80 in a current-event buffer. The current-event buffer is a wrap-around buffer that is long enough to store pre-trigger +1 samples. Each time the microprocessor obtains a sample, data representing the sample is stored at the end of the current-event buffer. Once filled, the current-event buffer wraps-around and begins to sequentially overwrite itself until a trigger-event occurs.

The current-event buffer moves through memory as the recording session progresses. Initially, the current-event buffer occupies the first pre-trigger +1 samples of the memory allocated to the first stored event. The current-event buffer will remain in this location continually overwriting itself until a trigger-event occurs.

To determine when a trigger-event occurs, each sample is analyzed 154 to see if it satisfies the trigger criteria. If the sample is not a trigger-event, control returns to block 150 and another sample is obtained from the accelerometer 12. If the sample satisfies the trigger criteria, the pre-trigger sample and the trigger-event (contained in the current-event buffer) are preserved in memory. Next, the subsequent post-trigger samples are obtained and stored 156 in memory.

As the post-trigger events are obtained and stored, the microprocessor computes 158 a rank for the event. The rank is used to determine which events are to be overwritten once the current memory segment is filled. In the disclosed embodiment, the rank is computed by summing the resultants of each post-trigger sample. However, the manner of computing the rank will vary from application to application. For example, the rank may be computed to be (a) the largest absolute value, or peak value, of the samples within the event; (b) the root mean square (rms) value of the event; (c) the summation of the absolute value of all of the samples within the event; (d) the summation of the value of all of the samples within the event; or (e) the acceleration of the event. Any of these methods for computing the event rank can be based solely upon single dimension data such as the data from a single axis of the accelerometer or upon multi-dimensional data such as that obtained from multiple axes of the accelerometer. For multi-dimensional ranking, vector summations or approximations of vector summations can be used in conjunction with any of the above ranking methods. The time and date of the trigger event, the address of the beginning of the current-event buffer, the sensed temperature, and the rank of the event are stored 160 in memory 20 in the event header 108. Because it is a wrap around buffer, the address of the beginning of the current-event buffer varies from event to event. By storing this address in the header 108, the proper sequence of the stored samples can be determined when the data is analyzed.

Once the event and its header are recorded, the current-event buffer is moved to a new location in memory based on whether the current segment of memory is filled 162. If the current segment is not filled, the current-event buffer is moved 164 to occupy the memory allocated to the first pre-trigger +1 samples of the next sequential event in that segment of memory. Afterwards, control returns to block 150 and the microprocessor 18 again samples the tri-axial accelerometer storing the samples in the current-event buffer until another trigger-event occurs.

If the current segment of memory is filled, the data recorder will begin overwriting the stored events in the current segment of memory based on the rank assigned to each event. During the overwriting procedure, the sampling and storing process remains identical to that described above with the exception of how the current-event buffer is moved between events. Instead of moving the current-event buffer to the next sequential event, the current-event buffer is moved 166 to occupy the first pre-trigger +1 samples of the stored event having the lowest rank. As a result, once the current segment of memory is filled, each subsequent event belonging in the same segment of memory will be written over the stored event in that segment with the lowest rank. Because the overwrite scheme only considers events recorded in the current segment, all events in previous and future segments of memory are not subject to overwriting.

The overwriting process continues until the recording session progresses into the next time window 168. At that point, the recording process advances to the next segment of memory 170. This is accomplished by moving the current-event buffer into the first pre-trigger +1 samples of the first event for the next segment of memory. Following the above described procedure, the current-event buffer is moved through the new segment as events are stored. This process repeats itself throughout the entire recording session one segment of memory at a time. Upon completion of the recording session, the memory 20 contains time history data of physical variables segmented by time window. This data is downloaded or otherwise recovered using conventional techniques through the RS-232 interface 28.

V. First Alternative Embodiment

In an alternative embodiment (FIGS. 6 and 7), the memory is effectively partitioned by event "type", as well as by time window, to ensure that the time history includes data representative of different types of events. For example, in the transportation industry example, it is often desirable to obtain data on two different types of events. The first are shock or impact-type events, which are transient and recorded upon sensing a trigger. The second are vibration-type events, which are steady-state and recorded at time intervals. By partitioning the memory by event type, the presence of data representative of both types of events is assured.

Figure 6:
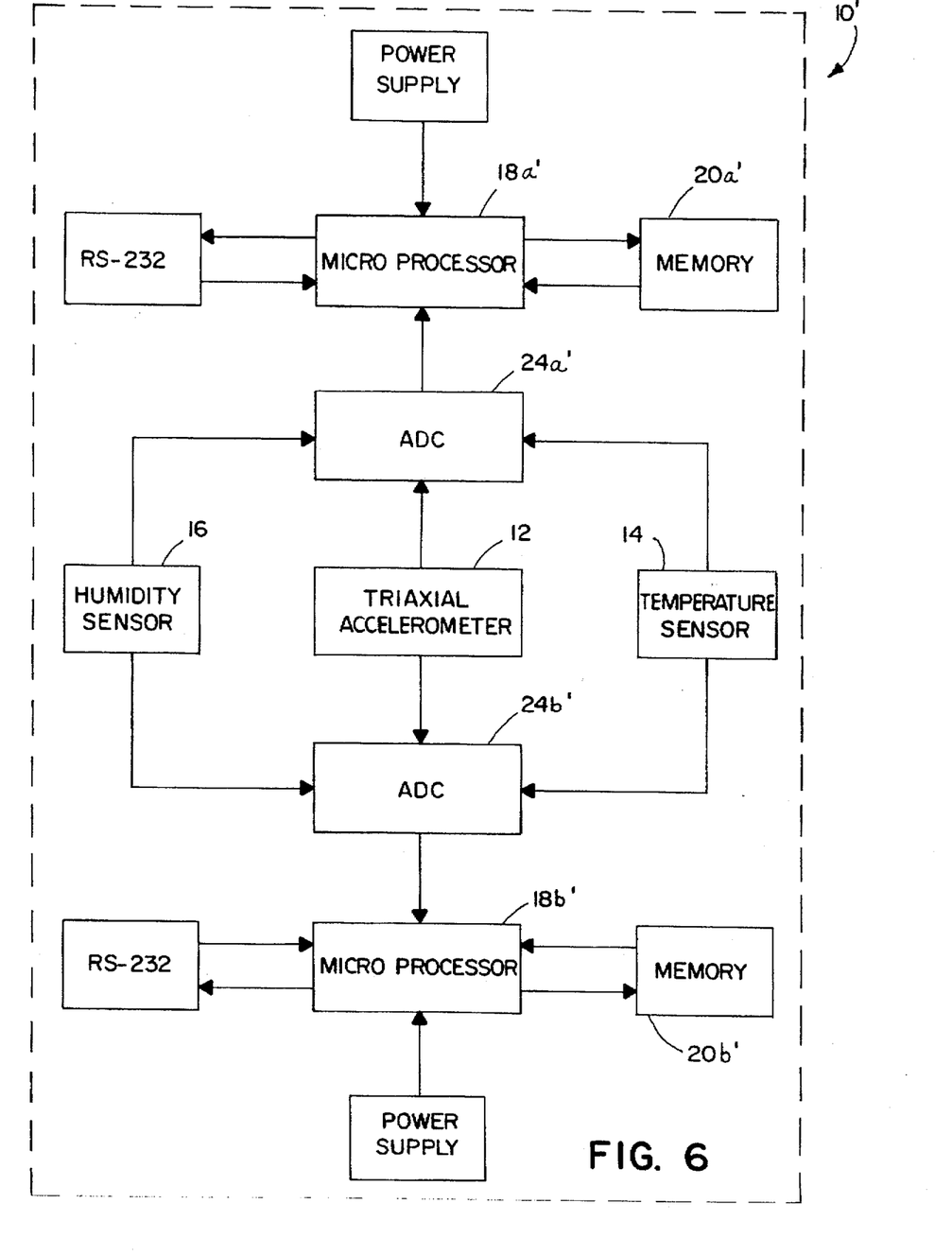
FIG. 6 is a block diagram of an alternative embodiment of the data recorder.

In this alternative embodiment, the data recorder 10' includes two separate microprocessors 18a' and 18b', two separate ADCs 24a' and 24b', and two separate memories 20a' and 20b'. The first microprocessor 18a' functions as discussed above to collect transient data from the accelerometer 12 via ADC 24a' and store that data in memory 18a' using event-triggered recording. The second microprocessor 18b' collects vibration data from the accelerometer 12 via ADC 24b' and stores that data in memory 20b' using time-triggered recording. Either microprocessor 20a' or 20b' can be programmed to operate under any of the modes disclosed above.

As in the preferred embodiment, memories 20a' and 20b' are each partitioned to include segments corresponding to time windows in the recording session. In addition, both microprocessors operate according to the overwrite scheme of the preferred embodiment to provide a time history of data that is partitioned by time window and effectively partitioned by event type.

VI. Second Alternative Embodiment

In a second alternative embodiment, event-type partitioning is implemented in a data recorder 10 having a single microprocessor 18. Except as described below, this embodiment is generally identical to the preferred embodiment. In this embodiment, the microprocessor 18 maintains a current-event buffer similar to the current-event buffer of the preferred embodiment except that it coincides in length with a complete event rather than pre-trigger +1 samples. In addition, the memory 20 is partitioned to include a set of look-up tables for each time window of the recording session. Each set of tables includes separate rank and address look-up tables for each type of event. The look-up tables provide a listing of the rank and address of each stored event by time window and event type. The length of each table coincides with the desired number of events to be preserved for each type of event during the corresponding time window.

In the operation of the second alternative embodiment (FIG. 7), the microprocessor 18 repeatedly samples 250 the instruments and stores 252 the data in the current-event buffer. When it is determined 254 that a trigger-event has occurred (either time-based for vibration data or trigger-based for transient data), the appropriate number of post-trigger samples are read and stored 256 in the current-event buffer overwriting old data as necessary. Simultaneously, a rank is generated 258 for the event. The time and date of the trigger event, the address of the beginning of the current-event, the sensed temperature, and the rank of the event are stored 260 in memory 20 in the event header 108. Next, it is determined 262 if the rank and address tables corresponding to the current event are filled. If not, the rank and address of the event are stored 264 in the appropriate set of look-up tables, and the current-event buffer is moved 274 to the location of the next sequential event.

Figure 7:
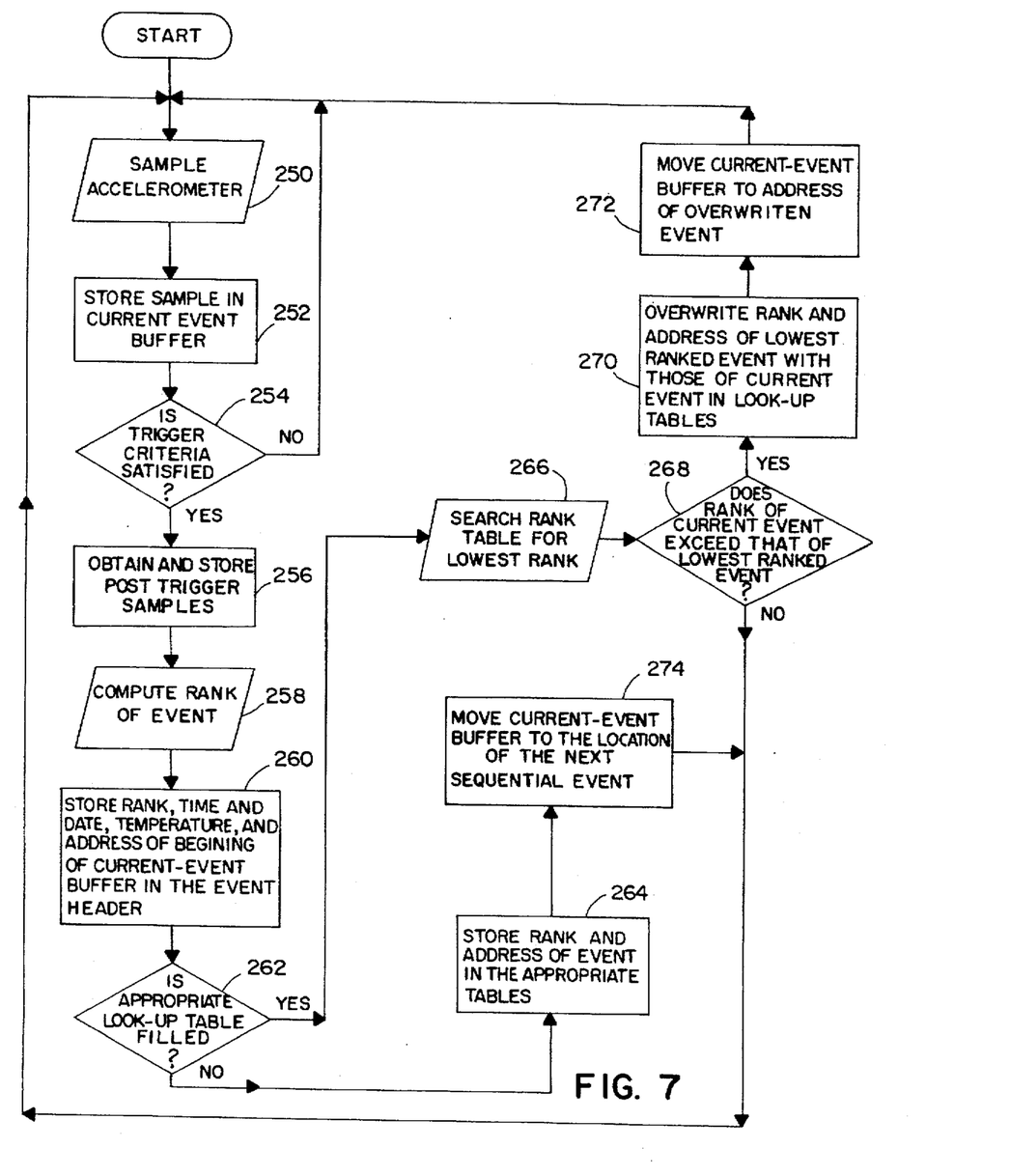
FIG. 7 is a flow chart illustrating the alternative overwrite process.

The corresponding rank and address for each event are preferably stored in the same position in each table to allow easy correlation between the two numbers. After the look-up tables corresponding to the type and time window of the current event are filled, the rank table is searched 266 for the stored event with the lowest rank. The microprocessor then determines 268 if the rank of the current event exceeds that of the stored event with the lowest rank. If so, the rank and address of the current event are written over 270 those of the lowest ranked event in both the rank and address tables. In addition, the current-event buffer is moved 272 in memory to occupy the location of the overwritten event. The address of the overwritten event is retrieved from the address table before it is overwritten. If the current event has a lower rank than all of the previously stored events in the corresponding segment of memory, the current event data is not preserved and the current-event buffer remains at its current location. This process repeats itself for each time window of the recording session.

Upon completion of the recording session, the memory contains a time history of data having representative data for each type of event for each time window. The data is retrieved from memory as discussed above. By reference to the internal look-up tables, the type of each event is readily determined.

The above descriptions are those of preferred embodiments of the invention. Various alterations and changes can be made without departing from the spirit and broader aspects of the invention as defined in the appended claims, which are to be interpreted in accordance with the principles of patent law including the doctrine of equivalents.

The embodiments of the invention in which an exclusive property or privilege is claimed are defined as follows:

1. A method for recording time history data obtained during a recording session comprising the steps of:

dividing a memory into a plurality of fixed-length segments, each segment corresponding to a mutually distinct time window of the recording session and being of sufficient size to record a plurality of events;

noting a current recordable event;

determining whether the segment of memory corresponding to the time window during which the current recordable event occurred is full;

if the segment of memory corresponding to the time window during which the current recordable event occurred is not full, then designating the current recordable event a to-be-recorded event;

if the segment of memory corresponding to the time window during which the current recordable event occurred is full, determining whether the current recordable event is more significant than any previously recorded event only within the same time window as the current recordable event, in which case the current recordable event is designated a to-be-recorded event;

storing data representative of the to-be-recorded event in the segment of memory corresponding to the time window within which the to-be-recorded event occurred, if the segment of memory corresponding to the time window during which the to-be-recorded event occurred is full, said storing step including overwriting a less significant previously recorded event in the segment of memory corresponding to the time window during which the to-be-recorded event occurred; and repeating said noting, determining, designating, and storing steps for the entire recording session.

2. The method of claim 1 wherein said determining step includes, when the segment of memory corresponding to the time window during which the event occurred is filled, determining the previously stored event in the segment of memory to be overwritten.

3. The method of claim 2 further comprising computing a rank for each event; and wherein said determining step includes determining the previously stored event with the lowest rank.

4. The method of claim 3 further comprising creating a data record for each to-be-recorded event, the record including at least one physical variable and the rank of the event; and wherein the data representative of the event is the record.

5. The method of claim 4 wherein each event includes a plurality of samples each having an absolute value; and wherein said computing step is further defined as computing the rank of the event to be a largest of the absolute values of the samples.

6. The method of claim 4 wherein said computing step is further defined as computing the rank of the event to be a root mean square value of the event.

7. The method of claim 4 wherein each event includes a plurality of samples each having an absolute value; and wherein said computing step is further defined as computing the rank of the event to be a summation of the absolute values of the samples.

8. The method of claim 4 wherein each event includes a plurality of samples each having a value; and wherein said computing step is further defined as computing the rank of the event to be a summation of the values of the samples.

9. The method of claim 4 wherein the event includes multidimensional data; and wherein said computing step is further defined as computing the rank of the event to be a root mean square of vector summations of the multidimensional data.

10. The method of claim 5 wherein each sample includes multidimensional data; and wherein each sample is represented by a vector summation of the multidimensional data.

11. The method of claim 7 wherein each sample includes multidimensional data; and wherein each sample is represented by a vector summation of the multidimensional data.

12. The method of claim 8 wherein each sample includes multidimensional data; and wherein each sample is represented by a vector summation of the multidimensional data.

13. The method of claim 12, wherein each sample includes data representative of acceleration.

14. A method for recording time history data obtained during a recording session, comprising the steps of:

dividing a memory into a plurality of fixed-length segments, each segment assigned to a distinct portion of time during the recording session and being of sufficient size to record a plurality of events;

dividing each segment of memory into a plurality of fixed-length subsegments, each of the subsegments assigned to a distinct type of event within the portion of time, each subsegment being of sufficient size to record a plurality of events;

noting a recordable event of a type and occurring within one of the portions of time;

storing data representative of the recordable event in the subsegment of memory assigned to the type of event and the portion of time during which the event occurred, if the segment of memory corresponding to the type of the recordable event and the time window during which the recordable event occurred is full, said storing step including overwriting a less significant previously recorded event in the segment of memory corresponding to the type of the recordable event and the time window during which the recordable event occurred; and repeating said obtaining and storing steps for the entire recording session.

15. An environmental data recorder for recording time history data of physical variables, comprising:

a housing;

an instrument means for sensing at least one physical variable during a recording session, said instrument means housed within said housing;

a memory means for storing data, said memory means including a plurality of fixed-length segments each assigned to a distinct portion of said recording session and being of sufficient size to record a plurality of events, said memory means housed within said housing; and a control means for repeatedly polling said instrument means to generate a plurality of measurements, said control means including storing means for storing at least some of said measurements only in a segment of memory assigned to said portion of said recording session during which said measurement was generated, said control means further including a determining means for determining a previously stored measurement to be overwritten by a current measurement, wherein said current measurement and said previously stored measurement occur during the same portion of said recording session, said control means also including an overwrite means for overwriting said previously stored measurement with said current measurement, said control means housed within said housing.

16. The recorder of claim 15 wherein said control means further includes a computing means for computing a rank for each of said measurements, said rank computed as a function of said physical variable; and wherein said determining means is further defined as a determining means for determining a previously stored measurement with a rank lower than all other previously stored measurements.

17. The recorder of claim 16 wherein each segment of said memory is effectively partitioned into a plurality of fixed-length subsegments, each of said subsegments dedicated to storing a plurality of measurements having a common characteristic.

18. The recorder of claim 16 wherein each segment of memory is effectively partitioned to include a first subsegment for storing a plurality of impact type events and a second subsegment for storing a plurality of vibration type events.

19. The recorder of claim 15 wherein each segment of memory is partitioned to include a first subsegment for storing a plurality of events of a first type and a second subsegment for storing a plurality of events of a second type.

20. An apparatus for recording time history data during a recording session having a plurality of time windows, comprising:

an instrument means for sensing a physical variable;

a memory means for storing data, said memory means having a plurality of fixed-length segments, each of said segments being uniquely assigned to one of said plurality of time windows and being of sufficient size to record a plurality of events;

a control means for repeatedly sampling said instrument means to obtain a plurality of current events and storing at least some of said events in said segment of said memory means assigned to said time window during which said event occurred; and an overwrite means for overwriting one of said events stored within said memory means only with a current event which occurred during the same said time window.

21. The apparatus of claim 20 wherein each of said events corresponds to one of a plurality of event types; and wherein said overwrite means is further defined as a an overwrite means for overwriting a stored event with a current event, wherein said stored event and said current event correspond to the same said time window and the same said event type.

* * * * *